(12) United States Patent
Bregler et al.

(10) Patent No.: US 10,657,114 B2
(45) Date of Patent: May 19, 2020

(54) RESERVING KEY SPECIFICATIONS

(71) Applicant: SAP SE, Walldorf (DE)

(72) Inventors: Jonathan Bregler, Kraichtal (DE);
Alexander Bunte, Heidelberg (DE);
Arne Harren, Walldorf (DE); Andreas Kellner, Birkenau-Löhrbach (DE);
Daniel Kuntze, Bruchsal (DE); Simon Lueders, Walldorf (DE); Volker Sauermann, Dossenheim (DE);
Michael Schnaubelt, Leimen (DE);
Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 351 days.

(21) Appl. No.: 15/824,041

(22) Filed: Nov. 28, 2017

(65) Prior Publication Data
US 2019/0163772 A1    May 30, 2019

(51) Int. Cl.
*G06F 16/22* (2019.01)
*G06F 16/25* (2019.01)

(52) U.S. Cl.
CPC ...... *G06F 16/2272* (2019.01); *G06F 16/2282* (2019.01); *G06F 16/254* (2019.01)

(58) Field of Classification Search
CPC . G06F 16/2272; G06F 16/2282; G06F 16/254
USPC ........................................................ 707/741
See application file for complete search history.

(56) References Cited

U.S. PATENT DOCUMENTS

| | | | |
|---|---|---|---|
| 7,124,148 B2 | 10/2006 | Sauermann | |
| 7,222,308 B2 | 5/2007 | Sauermann et al. | |
| 7,231,387 B2 | 6/2007 | Sauermann et al. | |
| 7,257,599 B2 | 8/2007 | Sauermann et al. | |
| 7,310,719 B2 | 12/2007 | Von Bergen et al. | |
| 7,337,295 B2 | 2/2008 | Von Bergen et al. | |
| 7,373,340 B2 | 5/2008 | Sauermann et al. | |
| 7,403,495 B2 | 7/2008 | Sauermann | |
| 7,415,458 B2 | 8/2008 | Sauermann | |
| 7,447,987 B2 | 11/2008 | Sauermann | |
| 7,454,454 B2 | 11/2008 | Sauermann | |
| 7,487,165 B2 | 2/2009 | Sauermann et al. | |
| 7,574,676 B2 | 8/2009 | Sauermann | |
| 7,590,683 B2 | 9/2009 | Bergen et al. | |

(Continued)

OTHER PUBLICATIONS

Final office action issued in U.S. Appl. No. 15/637,531 dated Nov. 29, 2019, 19 pages.

(Continued)

*Primary Examiner* — Dung K Chau
(74) *Attorney, Agent, or Firm* — Fish & Richardson P.C.

(57) ABSTRACT

An import configuration section of a file is identified, where the import configuration identifies a database table. Key specifications of the database table are reserved based on the import configuration. A first and a second Boolean flag parameter associated with the database table is identified. A determination is made that i) a value of the first Boolean flag indicates importing of entries from the file into the database table is allowed, and that ii) a value of the second Boolean flag indicates removal of entries of the database table is allowed. In response to the determining entries are removed from the database table corresponding to the key specifications, and entries are imported from the file into the database table corresponding to the key specifications.

20 Claims, 4 Drawing Sheets

(56) References Cited

U.S. PATENT DOCUMENTS

| | | | |
|---|---|---|---|
| 7,610,582 B2 | 10/2009 | Becker et al. | |
| 7,647,592 B2 | 1/2010 | Sauermann | |
| 7,653,452 B2 | 1/2010 | Sauermann et al. | |
| 7,664,858 B2 | 2/2010 | Sauermann | |
| 7,665,030 B2 | 2/2010 | Sauermann et al. | |
| 7,685,510 B2 | 3/2010 | Sauermann | |
| 7,725,900 B2 | 5/2010 | Sauermann | |
| 7,730,053 B2 | 6/2010 | Sauermann | |
| 7,752,628 B2 | 7/2010 | Sauermann | |
| 7,797,286 B2 | 9/2010 | Sauermann | |
| 7,873,666 B2 | 1/2011 | Sauermann | |
| 7,900,155 B2 | 3/2011 | Sauermann | |
| 8,074,206 B2 | 12/2011 | Sauermann et al. | |
| 8,078,985 B2 | 12/2011 | Sauermann | |
| 8,108,798 B2 | 1/2012 | Sauermann | |
| 8,171,422 B2 | 5/2012 | Sauermann | |
| 8,203,972 B2 | 6/2012 | Sauermann | |
| 8,224,938 B2 | 7/2012 | Sauermann | |
| 8,510,710 B2 | 8/2013 | Harren et al. | |
| 8,621,385 B2 | 12/2013 | Sauermann et al. | |
| 9,026,525 B2 | 5/2015 | Harren et al. | |
| 9,026,857 B2 | 5/2015 | Becker et al. | |
| 9,047,105 B2 | 6/2015 | Kinder et al. | |
| 9,069,832 B2 | 6/2015 | Becker et al. | |
| 9,600,269 B1 | 3/2017 | Bregler et al. | |
| 9,704,168 B2* | 7/2017 | Chauhan | G06Q 30/0201 |
| 2004/0122865 A1* | 6/2004 | Stahl | G06F 16/214 |
| 2004/0220893 A1 | 11/2004 | Spivack et al. | |
| 2005/0044110 A1 | 2/2005 | Herzenberg et al. | |
| 2005/0055331 A1 | 3/2005 | Sauermann et al. | |
| 2006/0005017 A1* | 1/2006 | Black | H04L 63/0428 713/165 |
| 2006/0179058 A1* | 8/2006 | Bram | G06F 21/121 |
| 2008/0046462 A1* | 2/2008 | Kaufman | G06F 16/26 |
| 2009/0265314 A1 | 10/2009 | Kindsvogel et al. | |
| 2010/0082549 A1 | 4/2010 | Hollingsworth et al. | |
| 2014/0215385 A1 | 7/2014 | Sauermann | |
| 2015/0106736 A1 | 4/2015 | Torman et al. | |
| 2016/0072817 A1 | 3/2016 | Makhervaks et al. | |
| 2016/0085841 A1 | 3/2016 | Dorfman et al. | |
| 2016/0094681 A1* | 3/2016 | Wu | G06F 16/211 709/203 |
| 2016/0179850 A1* | 6/2016 | Martin | G06F 16/214 707/634 |
| 2016/0182315 A1 | 6/2016 | Salokanto et al. | |
| 2016/0182327 A1* | 6/2016 | Coleman, Jr. | H04L 43/103 370/329 |
| 2016/0294881 A1 | 10/2016 | Hua et al. | |
| 2017/0177892 A1 | 6/2017 | Tingstrom et al. | |
| 2017/0322991 A1 | 11/2017 | Tran et al. | |
| 2018/0062956 A1* | 3/2018 | Schultz | H04L 41/12 |
| 2019/0005074 A1 | 1/2019 | Bregler et al. | |
| 2019/0005108 A1 | 1/2019 | Bregler et al. | |
| 2019/0007895 A1 | 1/2019 | Bregler et al. | |
| 2019/0005054 A1 | 10/2019 | Bregler et al. | |

OTHER PUBLICATIONS

Final office action issued in U.S. Appl. No. 15/637,554 dated Oct. 21, 2019, 16 pages.

Non-Final Office Action issued in U.S. Appl. No. 15/637,554 dated Jun. 7, 2019, 15 pages.

Non-Final Office Action issued in U.S. Appl. No. 15/637,698 dated Mar. 7, 2019, 12 pages.

Non-Final Office Action issued in U.S. Appl. No. 15/637,531 dated May 9, 2019, 42 pages.

Non-final office action issued in U.S. Appl. No. 15/637,698 dated Aug. 26, 2019, 14 pages.

* cited by examiner

RESERVING KEY SPECIFICATIONS

BACKGROUND

SAP HANA is an in-memory, column-oriented, relational database management system. The HANA platform is fundamentally based on the principle of pushing down data intensive computations into a HANA database layer in order to benefit from HANA's in-memory capabilities and to avoid unnecessary data transfers between the database layer and an application layer. Computations can be pushed down using, for example, Structured Query Language (SQL) script procedures, different types of database views, and application functions.

SUMMARY

The present disclosure describes reservation of key specifications of a database table. Specifically, the present disclosure describes identifying an import configuration section of a file, where the import configuration identifies a database table. Key specifications of the database table are reserved based on the import configuration. A first and a second Boolean flag parameter associated with the database table is identified. A determination is made that i) a value of the first Boolean flag indicates importing of entries from the file into the database table is allowed, and that ii) a value of the second Boolean flag indicates removal of entries of the database table is allowed. In response to determining that i) the value of the first Boolean flag indicates importing of entries from the file into the database table is allowed, and that ii) the value of the second Boolean flag indicates removal of entries of the database table is allowed: i) removing entries from the database table corresponding to the key specifications, and ii) importing entries from the file into the database table corresponding to the key specifications.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described methodology is to make possible a database table that can be populated by both a comma-separated value (CSV) file or dynamically by an application (or both) without overwriting or deleting (or both) entries from another source such that consistent data is ensured. Second, the described methodology includes preventing collisions between data during deployment. Avoidance of unnecessary collisions can save runtime and central processing unit (CPU) load, as well as reducing traffic on the database. Third, avoidance of collisions can speed up deployment processes. For example, in complex scenarios, the deployment of database artifacts can lead to the re-deployment of hundreds or thousands of existing database objects, many of which may be re-deployed unnecessarily. Fourth, the described methodology can speed up turnaround times for development activities and application installation times. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes reservation of key specifications of a database table, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Figure 1:
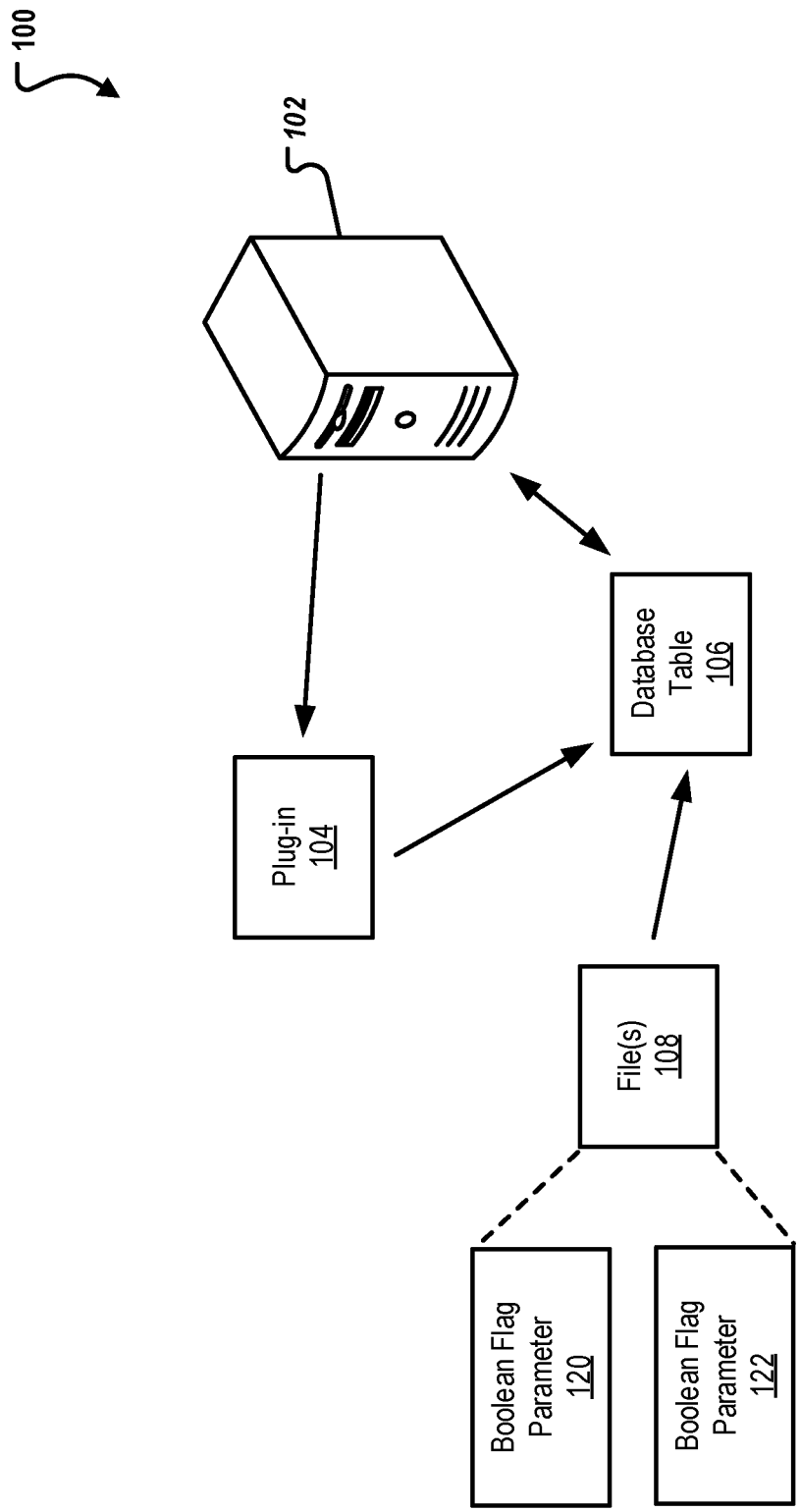
FIG. 1 is a system for database deployment, including reserving key specifications, according to an implementation of the present disclosure.

FIG. 1 illustrates a system 100 for database deployment, including reserving key specifications. The system 100 includes a computing system 102, a plug-in module 104, a database table 106, and a data file 108. The database table 106 and the files 108 can be stored by respective data stores, for example, one or more physical storage devices located in one or more physical locations. In some cases, the file 108 includes multiple files. In some cases, the file 108 is a comma-separated value file. The computing system 102 can be in communication with the database table 106 and the plug-in module 104.

In some implementations, the computing system 102 (for example, using an application executing on the computing system 102) provides reservation of key specifications of the database table 106 to prohibit the import or overwrite or both import and overwrite of data associated with the file 108 into the database table 106. As such, manual insertion of data into the database table 106 (for example, a user interacting with the database table 106 utilizing a computing system) can be provided as opposed to dynamically updating the corresponding file of the database table 106. This minimizes or prevents application-caused collisions of data within the database table 106.

The plug-in module 104 provides access to a first Boolean flag parameter 120 and a second Boolean flag parameter 122 included in the file 108. The first Boolean flag parameter 120 is associated with an indication of allowance or disallowance of importing entries from the file 108 into the database table 106, and the second Boolean flag parameter 122 is associated with an indication of allowance or disallowance of removal of entries of the database table 106. Specifically, based on the values of the Boolean flag parameters 120, 122 (for example, TRUE or FALSE), the Boolean flag parameters 120, 122 are associated with allowance or disallowance of respective actions, as detailed in the following. Thus, depending on a desired state of the system 100, the flag parameters 120, 122 can be appropriately set, for example, by the computing system 102 or the plug-in module 104 or both the computing system 102 and the plug-in module 104.

In some implementations, the first Boolean flag parameter 120 is a "no_data_import" parameter. That is, when the first Boolean flag parameter 120 is set to TRUE, importation of data from the file 108 into the database table 106 is disallowed, and when the first Boolean flag parameter 120 is set to FALSE, importation of data from the file 108 into the database table 106 is allowed. In some implementations, the second Boolean flag parameter 122 is a "delete_existing_foreign_data" parameter. That is, when the second Boolean flag parameter 122 is set to TRUE, deletion of data from the database table 106 is allowed. When the second Boolean flag parameter 122 is set to FALSE, deletion of data from the database table 106 is disallowed.

Figure 2:
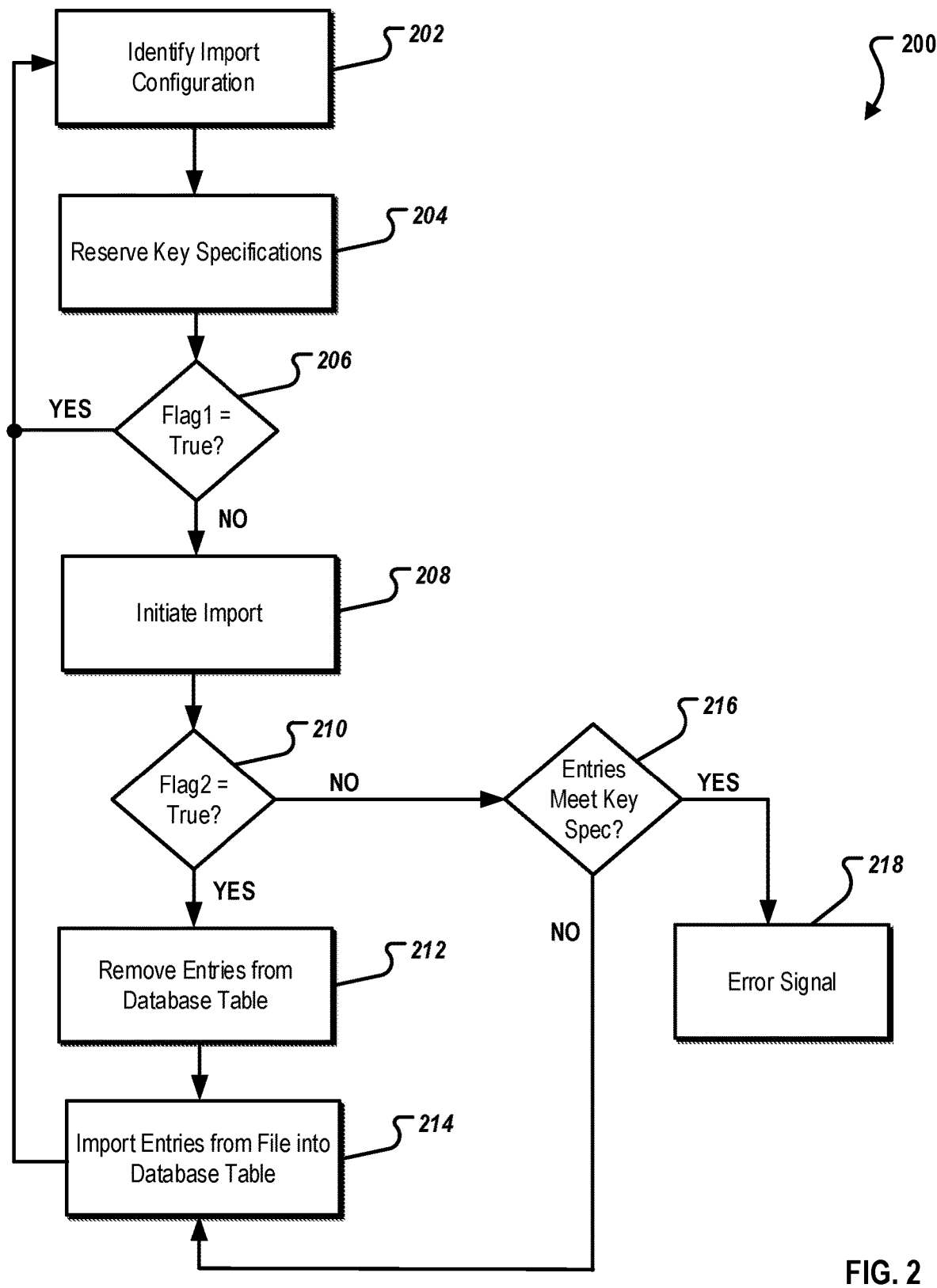
FIG. 2 is a flowchart illustrating an example of a computer-implemented method for database deployment, including reserving key specifications, according to an implementation of the present disclosure.

FIG. 2 is a flowchart illustrating an example of a computer-implemented method 200 for database deployment, including reserving key specifications, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, the computing system 102 identifies an import configuration section of the file 108. In some implementations, the import configuration section of the file 108 can identify the database table 106. In some implementations, the file 108 can include multiple import configuration sections. From 202, method 202 proceeds to 204.

At 204, the computing system 102 reserves key specifications of the database table 106 based on the import configuration section of the file 108. From 204, the method proceeds to 206.

At 206, the computing system 102 determines the value of the first Boolean flag 120. Specifically, the computing system 102 determines whether the value of the first Boolean flag 120 indicates allowance or disallowance of importing entries from the file 108 into the database table 106. In some implementations, the file 108 sets the value of the first Boolean flag 120, for example, by a user or as a result of an automated process.

If the computing system 102 determines that the value of the first Boolean flag 120 indicates importing of entries of the file 108 into the database table 106 is disallowed (for example, the value of the "no_data_import" parameter is TRUE), method 200 proceeds back to 202.

If the computing system 102 determines that the value of the first Boolean flag 120 indicates importing of entries of the file 108 into the database table 106 is disallowed (for example, the "no_data_import" parameter is TRUE), the computing system 102 prevents importation of entries from the file 108 into the database table 106 and maintains the existing entries of the database table 106. In some implementations, in response to determining that the value of the first Boolean flag 120 indicates importing of entries of the file 108 into the database table 106 is disallowed (for example, the "no_data_import" parameter is TRUE), the computing system 102 identifies a manual import of entries into the database table 106. That is, the computing system 102 identifies manual insertion by a user interacting within the database table 106 (for example, utilizing a computing system) of data into the database table 106.

If, however, the computing system 102 determines that the value of the first Boolean flag 120 indicates importing of entries of the file 108 into the database table 106 is allowed (for example, the value of the "no_data_import" parameter is FALSE), method 200 proceeds to 208. At 208, the computing system 102 initiates importation of entries of the file 108 into the database table 106. From 208, method 202 proceeds to 210.

At 210, the computing system 102 determines the value of the second Boolean flag 122. Specifically, the computing system 102 determines whether the value of the second Boolean flag 122 indicates allowance or disallowance of removal of entries from the database table 106. In some implementations, the file 108 sets the value of the second Boolean flag 122, for example, by a user or as a result of an automated process.

If the computing system 102 determines that the value of the first Boolean flag 120 indicates deletion of entries from the database table 106 is allowed (for example, the value of the "delete_existing_foreign_data" parameter is TRUE), method 200 proceeds to 212.

At 212, the computing system 102 removes entries from the database table 106 corresponding to the key specifications (for example, key specifications reserved at 204). From 212, method 202 proceeds to 214.

At 214, the computing system 102 imports entries from the file 108 into the database table 106 corresponding to the key specifications. In summary, in response to determining that i) that the value of the first Boolean flag 120 indicates importing of entries of the file 108 into the database table 106 is allowed and that ii) the value of the first Boolean flag 120 indicates deletion of entries from the database table 106 is allowed (for example, the value of the "no_data_import" parameter is FALSE and the value of the "delete_existing_foreign_data" parameter is TRUE), the computing system 102 i) removes entries from the database table 106 corresponding to the key specifications and ii) imports entries from the file 108 into the database table 106 corresponding to the key specifications.

At 210, if the computing system 102 determines that the value of the first Boolean flag 120 indicates deletion of entries from the database table 106 is disallowed (for example, the value of the "delete_existing_foreign_data" parameter is FALSE) method 200 proceeds to 216.

At 216, the computing system 102 determines whether the database table 106 excludes entries corresponding to the (reserved) key specifications. That is, the computing system 102 determines whether there are entries in the database table 106 that meet the key specifications. From 216, method 200 proceeds to 214, where the computing system 102 imports entries from the file 108 into the database table 106 corresponding to the key specifications. In summary, in response to determining that i) the value of the first Boolean flag 120 indicates importing of entries of the file 108 into the database table 106 is allowed, that ii) the value of the first Boolean flag 120 indicates deletion of entries from the database table 106 is disallowed, and that iii) the database table 106 excludes entries corresponding to the key specifications (for example, the value of the "no_data_import" parameter is FALSE, the value of the "delete_existing_foreign_data" parameter is FALSE, and the database table 106 excludes entries corresponding to the key specifications), the computing system 102 imports entries from the file 108 into the database table 106 corresponding to the key specifications.

In some implementations, the computing system 102 imports entries from the file 108 into the database table 106 corresponding the key specifications independent of removing entries from the database table 106 corresponding to the key specifications. For example, in response to the computing system 102 determining that the database table 106 excludes entries corresponding to the key specification, the computing system 102 maintains the existing entries of the database table 106.

If, however, the computing system 102 determines at 216 that the database table 106 includes entries corresponding to the key specifications, method 200 proceeds to 218.

At 218, the computing system 102 generates an error signal. In some implementations, at 218, the computing system 102 can be configured to cease all importation of entries into the database table 106 and all deletions of entries from the database table 106. In summary, in response to determining that i) the value of the first Boolean flag 120 indicates importing of entries of the file 108 into the database table 106 is allowed, that ii) the value of the first Boolean flag 120 indicates deletion of entries from the database table 106 is disallowed, and that iii) the database table 106 includes entries corresponding to the key specifications (for example, the value of the "no_data_import" parameter is FALSE, the value of the "delete_existing_foreign_data" parameter is FALSE, and the database table 106 includes entries corresponding to the key specifications), the computing system 102 generates an error signal.

In some further implementations, the computing system 102 can generate a comma-separated value file after i) removing entries from the database table 106 corresponding to key specifications (for example, at 212) and after ii) importing entries from the file 108 into the database table 106 corresponding to the key specifications (for example, at 214).

Figure 3:
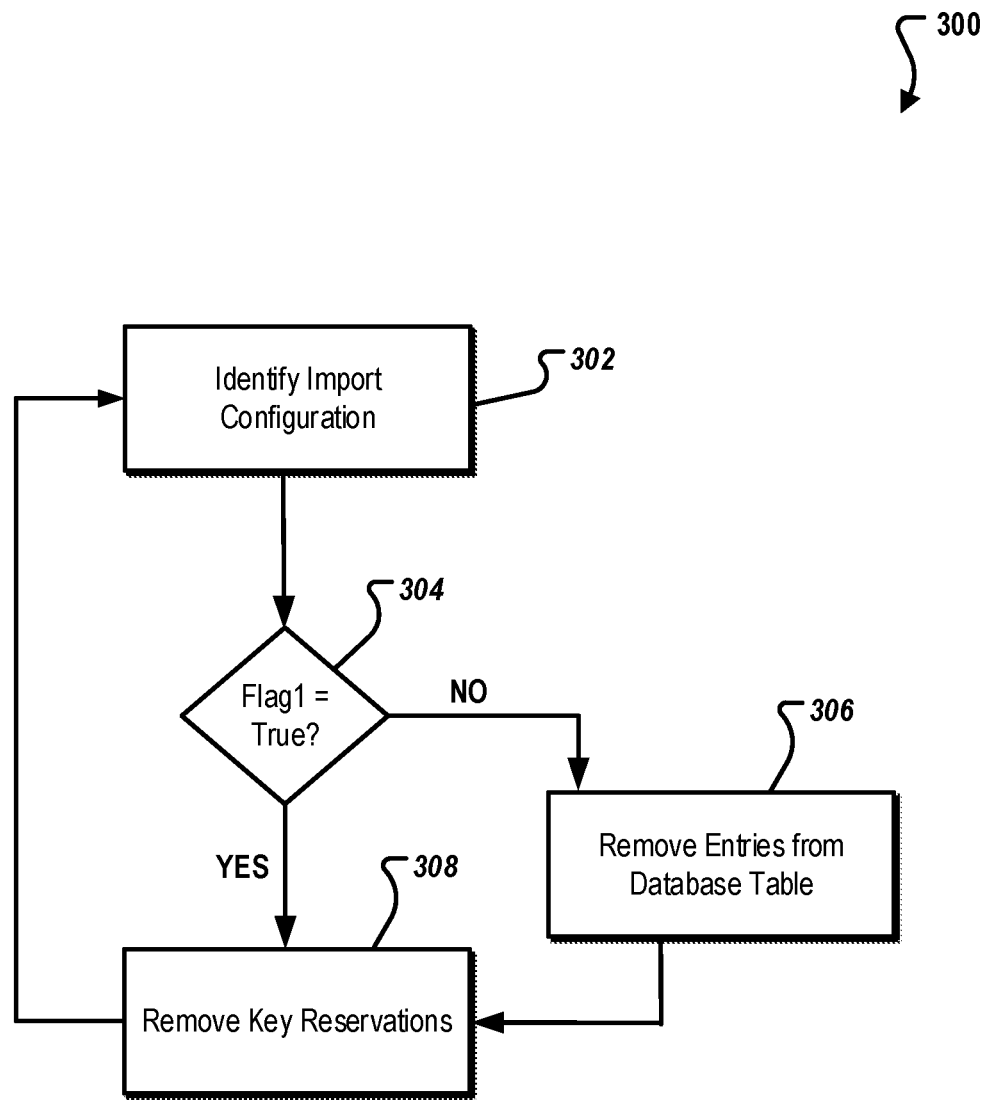
FIG. 3 is a flowchart illustrating an example of a computer-implemented method for an un-deployment phase of the database table subsequent to the deployment phase, according to an implementation of the present disclosure.

FIG. 3 is a flowchart illustrating an example of a computer-implemented method 300 for a un-deployment phase of the database table 106 subsequent to the deployment phase of FIG. 2, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, the computing system 102 identifies an import configuration section of the file 108. From 302, method 300 proceeds to 304.

At 304, the computing system 102 determines the value of the first Boolean flag 120. Specifically, the computing system 102 determines whether the value of the first Boolean flag 120 indicates allowance or disallowance of importing entries from the file 108 into the database table 106. If the computing system 102 determines that the value of the first Boolean flag 120 indicates importing of entries of the file 108 into the database table 106 is allowed (for example, the value of the "no_data_import" parameter is FALSE), method 300 proceeds to 306.

At 306, the computing system 102 removes entries from the database table 106 corresponding to the key specifications. From 306, method 300 proceeds to 308.

At 308, the computing system 102 removes the reservations of the key specifications of the database table 106 (for example, as reserved at 204).

If, however, the computing system 102 determines at 304 that the value of the first Boolean flag 120 indicates importing of entries of the file 108 into the database table 106 is disallowed (for example, the value of the "no_data_import" parameter is TRUE) method 300 proceeds to 308. As previously described, at step 308, the computing system 102 removes the reservations of the key specifications of the database table 106 (for example, as reserved at 204).

Figure 4:
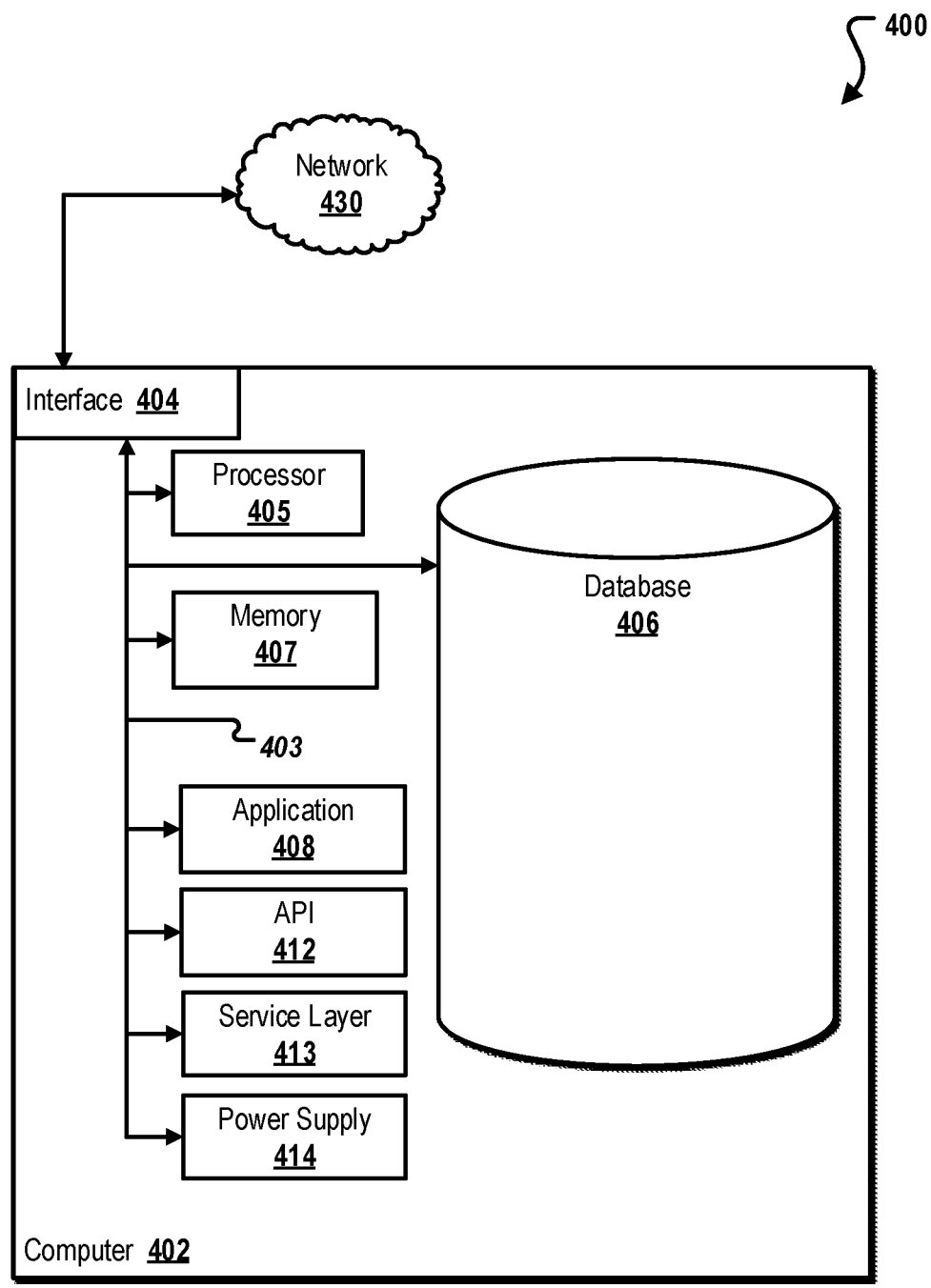
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method comprising identifying an import configuration section of a file, the import configuration identifying a database table; reserving key specifications of the database table based on the import configuration; identifying a first and a second Boolean flag parameter from the import configuration associated with the database table; determining that i) a value of the first Boolean flag indicates importing of entries from the file into the database table is allowed, and that ii) a value of the second Boolean flag indicates removal of entries of the database table is allowed; and in response to determining that i) the value of the first Boolean flag indicates importing of entries from the file into the database table is allowed, and that ii) the value of the second Boolean flag indicates removal of entries of the database table is allowed: i) removing entries from the database table corresponding to the key specifications, and ii) importing entries from the file into the database table corresponding to the key specifications.

The foregoing and other described implementations can each, optionally, include one or more of the following features.

A first feature, combinable with any of the following features, further comprising determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and in response to determining that the database table excludes entries corresponding to the key specifications, importing entries from the file into the database table corresponding to the key specifications.

A second feature, combinable with any of the previous or following features, wherein importing entries from the file into the database table corresponding to the key specifications is independent of removing entries from the database table corresponding to the key specifications.

A third feature, combinable with any of the previous or following features, further comprising in response to determining that the database table excludes entries corresponding to the key specifications, maintaining the existing entries of the database table.

A fourth feature, combinable with any of the previous or following features, further comprising determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and in response to determining that the database table includes entries corresponding to the key specifications, generating an error signal.

A fifth feature, combinable with any of the previous or following features, further comprising determining that the value of the first Boolean flag indicates importing of entries from the file into the database table is disallowed; and in response to determining that the value of the first Boolean flag indicates importing of entries from the file into the database table is disallowed, preventing import of entries from the file into the database table.

A sixth feature, combinable with any of the previous or following features, further comprising in response to determining that the value of the first Boolean flag indicates importing of entries from the file into the database table is disallowed, maintaining the existing entries of the database table.

A seventh feature, combinable with any of the previous or following features further comprising in response to determining that the value of the first Boolean flag indicates importing of entries from the file into the database table is disallowed, identifying a manual import of entries into the database table.

An eighth feature, combinable with any of the previous or following features further comprising generating a comma-separated values file from the database table after i) removing entries from the database table corresponding to the key specifications and ii) importing entries from the file into the database table corresponding to the key specifications.

In a second implementation, a non-transitory, computer-readable medium storing one or more instructions executable by a computer system to perform operations comprising identifying an import configuration section of a file, the import configuration identifying a database table; reserving key specifications of the database table based on the import configuration; identifying a first and a second Boolean flag parameter from the import configuration associated with the database table; determining that i) a value of the first Boolean flag indicates importing of entries from the file into the database table is allowed, and that ii) a value of the second Boolean flag indicates removal of entries of the database table is allowed; and in response to determining i) that the value of the first Boolean flag indicates importing of entries from the file into the database table is allowed, and that ii) the value of the second Boolean flag indicates removal of entries of the database table is allowed: i) removing entries from the database table corresponding to the key specifications, and ii) importing entries from the file into the database table corresponding to the key specifications.

The foregoing and other described implementations can each, optionally, include one or more of the following features.

A first feature, combinable with any of the following features, the operations further comprising: determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and in response to determining that the database table excludes entries corresponding to the key specifications, importing entries from the file into the database table corresponding to the key specifications.

A second feature, combinable with any of the previous or following features, wherein importing entries from the file into the database table corresponding to the key specifications is independent of removing entries from the database table corresponding to the key specifications.

A third feature, combinable with any of the previous or following features, the operations further comprising: determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and in response to determining that the database table includes entries corresponding to the key specifications, generating an error signal.

A fourth feature, combinable with any of the previous or following features, the operations further comprising: determining that the value of the first Boolean flag indicates importing of entries from the file into the database table is disallowed; and in response to determining that the value of the first Boolean flag indicates importing of entries from the file into the database table is disallowed, preventing import of entries from the file into the database table.

A fifth feature, combinable with any of the previous or following features, further comprising in response to determining that the value of the first Boolean flag indicates importing of entries from the file into the database table is disallowed, maintaining the existing entries of the database table.

In a third implementation, a computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising: identifying an import configuration section of a file, the import configuration identifying a database table; reserving key specifications of the database table based on the import configuration; identifying a first and a second Boolean flag parameter from the import configuration associated with the database table; determining that i) a value of the first Boolean flag indicates importing of entries from the file into the database table is allowed, and that ii) a value of the second Boolean flag indicates removal of entries of the database table is allowed; and in response to determining that i) the value of the first Boolean flag indicates importing of entries from the file into the database table is allowed, and that ii) the value of the second Boolean flag indicates removal of entries of the database table is allowed: i) removing entries from the database table corresponding to the key specifications, and ii) importing entries from the file into the database table corresponding to the key specifications.

The foregoing and other described implementations can each, optionally, include one or more of the following features.

A first feature, combinable with any of the following features, the operations further comprising determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and in response to determining that the database table excludes entries corresponding to the key specifications, importing entries from the file into the database table corresponding to the key specifications.

A second feature, combinable with any of the previous or following features, wherein importing entries from the file into the database table corresponding to the key specifications is independent of removing entries from the database table corresponding to the key specifications.

A third feature, combinable with any of the previous or following features, the operations further comprising determining that i) the value of the first Boolean flag indicates importing of entries from the file into the database table is allowed, and that ii) the value of the second Boolean flag indicates removal of the entries of the database table is disallowed; and in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and in response to determining that the database table includes entries corresponding to the key specifications, generating an error signal.

A fourth feature, combinable with any of the previous or following features, the operations further comprising determining that the value of the first Boolean flag indicates importing of entries from the file into the database table is disallowed; and in response to determining that the value of the first Boolean flag indicates importing of entries from the file into the database table is disallowed, preventing import of entries from the file into the database table.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method comprising:
identifying an import configuration section of a file, the import configuration identifying a database table;
reserving key specifications of the database table based on the import configuration;
identifying a first and a second Boolean flag parameter from the import configuration associated with the database table;
determining that i) a value of the first Boolean flag indicates importing of entries from the file into the database table is allowed, and that ii) a value of the second Boolean flag indicates removal of entries of the database table is allowed; and
in response to determining that i) the value of the first Boolean flag indicates importing of entries from the file into the database table is allowed, and that ii) the value of the second Boolean flag indicates removal of entries of the database table is allowed:
  i) removing entries from the database table corresponding to the key specifications, and
  ii) importing entries from the file into the database table corresponding to the key specifications.

2. The method of claim 1, further comprising:
determining that i) the value of the first Boolean flag indicates importing of entries from the file into the database table is allowed, and that ii) the value of the second Boolean flag indicates removal of the entries of the database table is disallowed;
in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and
in response to determining that the database table excludes entries corresponding to the key specifications, importing entries from the file into the database table corresponding to the key specifications.

3. The method of claim 2, wherein importing entries from the file into the database table corresponding to the key specifications is independent of removing entries from the database table corresponding to the key specifications.

4. The method of claim 2, in response to determining that the database table excludes entries corresponding to the key specifications, maintaining the existing entries of the database table.

5. The method of claim 1, further comprising:
determining that i) the value of the first Boolean flag indicates importing of entries from the file into the database table is allowed, and that ii) the value of the second Boolean flag indicates removal of the entries of the database table is disallowed;
in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and
in response to determining that the database table includes entries corresponding to the key specifications, generating an error signal.

6. The method of claim 1, further comprising:
determining that the value of the first Boolean flag indicates importing of entries from the file into the database table is disallowed; and
in response to determining that the value of the first Boolean flag indicates importing of entries from the file into the database table is disallowed, preventing import of entries from the file into the database table.

7. The method of claim 6, further comprising in response to determining that the value of the first Boolean flag indicates importing of entries from the file into the database table is disallowed, maintaining the existing entries of the database table.

8. The method of claim 6, in response to determining that the value of the first Boolean flag indicates importing of entries from the file into the database table is disallowed, identifying a manual import of entries into the database table.

9. The method of claim 1, further comprising generating a comma-separated values file from the database table after i) removing entries from the database table corresponding to the key specifications and ii) importing entries from the file into the database table corresponding to the key specifications.

10. A non-transitory, computer-readable medium storing one or more instructions executable by a computer system to perform operations comprising:
identifying an import configuration section of a file, the import configuration identifying a database table;
reserving key specifications of the database table based on the import configuration;
identifying a first and a second Boolean flag parameter from the import configuration associated with the database table;
determining that i) a value of the first Boolean flag indicates importing of entries from the file into the database table is allowed, and that ii) a value of the second Boolean flag indicates removal of entries of the database table is allowed; and
in response to determining that i) the value of the first Boolean flag indicates importing of entries from the file into the database table is allowed, and that ii) the value of the second Boolean flag indicates removal of entries of the database table is allowed:
  i) removing entries from the database table corresponding to the key specifications, and
  ii) importing entries from the file into the database table corresponding to the key specifications.

11. The computer-readable medium of claim 10, the operations further comprising:
determining that i) the value of the first Boolean flag indicates importing of entries from the file into the database table is allowed, and that ii) the value of the second Boolean flag indicates removal of the entries of the database table is disallowed;
in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and
in response to determining that the database table excludes entries corresponding to the key specifications, importing entries from the file into the database table corresponding to the key specifications.

12. The computer-readable medium of claim 11, wherein importing entries from the file into the database table corresponding to the key specifications is independent of removing entries from the database table corresponding to the key specifications.

13. The computer-readable medium of claim 10, the operations further comprising:
determining that i) the value of the first Boolean flag indicates importing of entries from the file into the database table is allowed, and that ii) the value of the second Boolean flag indicates removal of the entries of the database table is disallowed;
in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and in response to determining that the database table includes entries corresponding to the key specifications, generating an error signal.

14. The computer-readable medium of claim 10, the operations further comprising:
    determining that the value of the first Boolean flag indicates importing of entries from the file into the database table is disallowed; and
    in response to determining that the value of the first Boolean flag indicates importing of entries from the file into the database table is disallowed, preventing import of entries from the file into the database table.

15. The computer-readable medium of claim 14, further comprising in response to determining that the value of the first Boolean flag indicates importing of entries from the file into the database table is disallowed, maintaining the existing entries of the database table.

16. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        identifying an import configuration section of a file, the import configuration identifying a database table;
        reserving key specifications of the database table based on the import configuration;
        identifying a first and a second Boolean flag parameter from the import configuration associated with the database table;
        determining that i) a value of the first Boolean flag indicates importing of entries from the file into the database table is allowed, and that ii) a value of the second Boolean flag indicates removal of entries of the database table is allowed; and
        in response to determining that i) the value of the first Boolean flag indicates importing of entries from the file into the database table is allowed, and that ii) the value of the second Boolean flag indicates removal of entries of the database table is allowed:
            i) removing entries from the database table corresponding to the key specifications, and
            ii) importing entries from the file into the database table corresponding to the key specifications.

17. The computer-implemented system of claim 16, the operations further comprising:
    determining that i) the value of the first Boolean flag indicates importing of entries from the file into the database table is allowed, and that ii) the value of the second Boolean flag indicates removal of the entries of the database table is disallowed;
    in response to determining that i) the value of the first Boolean flag indicates importing of entries from the file into the database table is allowed, and that ii) the value of the second Boolean flag indicates removal of the entries of the database table is disallowed, determining that the database table excludes entries corresponding to the key specifications; and
    in response to determining that the database table excludes entries corresponding to the key specifications, importing entries from the file into the database table corresponding to the key specifications.

18. The computer-implemented system of claim 17, wherein importing entries from the file into the database table corresponding to the key specifications is independent of removing entries from the database table corresponding to the key specifications.

19. The computer-implemented system of claim 16, the operations further comprising:
    determining that i) the value of the first Boolean flag indicates importing of entries from the file into the database table is allowed, and that ii) the value of the second Boolean flag indicates removal of the entries of the database table is disallowed;
    in response to determining that i) the value of the first Boolean flag indicates importing of entries from the file into the database table is allowed, and that ii) the value of the second Boolean flag indicates removal of the entries of the database table is disallowed, determining that the database table includes entries corresponding to the key specifications; and
    in response to determining that the database table includes entries corresponding to the key specifications, generating an error signal.

20. The computer-implemented system of claim 16, the operations further comprising:
    determining that the value of the first Boolean flag indicates importing of entries from the file into the database table is disallowed; and
    in response to determining that the value of the first Boolean flag indicates importing of entries from the file into the database table is disallowed, preventing import of entries from the file into the database table.

* * * * *